(12) United States Patent
Buzzard et al.

(10) Patent No.: US 8,827,821 B2
(45) Date of Patent: Sep. 9, 2014

(54) TELESCOPING SHAFT ROLLER ASSEMBLY IN STEERING COLUMN

(71) Applicants: Donald A. Buzzard, Saginaw, MI (US); Troy A. Daenzer, Reese, MI (US)

(72) Inventors: Donald A. Buzzard, Saginaw, MI (US); Troy A. Daenzer, Reese, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/713,713

(22) Filed: Dec. 13, 2012

(65) Prior Publication Data
US 2014/0171209 A1 Jun. 19, 2014

(51) Int. Cl.
*F16C 3/035* (2006.01)

(52) U.S. Cl.
CPC ..................................... *F16C 3/035* (2013.01)
USPC .......................................................... 464/167

(58) Field of Classification Search
USPC ............... 464/77, 132, 167; 384/54; 280/775; 74/492, 493
See application file for complete search history.

(56) References Cited

U.S. PATENT DOCUMENTS

| 4,106,311 | A * | 8/1978 | Euler ............................... 464/77 |
| 6,200,225 | B1 * | 3/2001 | Hobaugh, II .................. 464/167 |
| 8,021,235 | B2 * | 9/2011 | Tinnin et al. .................. 464/167 |

* cited by examiner

*Primary Examiner* — Gregory Binda
(74) *Attorney, Agent, or Firm* — Cantor Colburn LLP

(57) ABSTRACT

A telescoping shaft in a steering column in a steering column is provided. The telescoping shaft includes an outer shaft having a bore extending in a longitudinal direction, an inner shaft telescopically received in the bore, the inner shaft rotationally fixed relative to the outer shaft and moveable relative to the outer shaft in the longitudinal direction, and at least one roller assembly positioned between the inner shaft and outer shaft. Each roller assembly of the at least one the roller assembly includes a spring having a first end and a second end spaced apart from the first end, a first roller positioned on the first end of the spring, and a second roller positioned on the second end of the spring, the spring urging the first roller and the second roller into contact with the outer shaft.

16 Claims, 5 Drawing Sheets

A-A

A-A

TELESCOPING SHAFT ROLLER ASSEMBLY IN STEERING COLUMN

BACKGROUND OF THE INVENTION

The following description relates to a telescoping shaft in a steering column, and in particular, a rolling element positioned between telescoping components of the telescoping shaft.

A telescoping shaft, such as an intermediate shaft, is commonly positioned in a steering column between an output shaft of the steering column and an input shaft of a steering gear. The intermediate shaft is used to transfer steering torque from the output shaft of the steering column to the input shaft of the steering gear.

A conventional intermediate shaft may include an outer tubular shaft element and an inner solid shaft element telescoped into the tubular shaft element. The tubular shaft element and solid shaft element may be coupled together to permit relative linear movement therebetween. To this end, roller bearings may be provided between the tubular shaft and solid shaft. Accordingly, a total length of the shaft components may be adjusted for use in a particular vehicle. Length change of the intermediate shaft is also desirable for assembly into the vehicle and/or to reduce force inputs to the steering column, for example, when the vehicle is driven on rough roads. Alternatively, the inner solid shaft may be an inner tubular shaft telescoped into the tubular shaft.

The roller bearings used in intermediate shafts may be linear bearings, which often use hardened steel roller or balls as a low friction mechanism between the solid shaft and tubular shaft. However, manufacturing tolerances may cause small clearances to exist in such an arrangement, and require a mechanism for delashing, i.e., taking up the clearances between the components. A wear plate has been used to preload rollers against respective tubular shaft interfaces. However, such an arrangement may be difficult and/or costly to assemble and/or manufacture.

Accordingly, it is desirable to provide a telescoping shaft assembly having a rolling element disposed therein that includes an easy to assemble and/or install mechanism to allow for smooth relative movement between shaft components and delashing between the shaft components.

SUMMARY OF THE INVENTION

According to an exemplary embodiment of the present invention, there is provided a telescoping shaft in a steering column including an outer shaft having a bore extending in a longitudinal direction, an inner shaft telescopically received in the bore, the inner shaft rotationally fixed relative to the outer shaft and moveable relative to the outer shaft in the longitudinal direction, and at least one roller assembly positioned between the inner shaft and outer shaft. Each roller assembly of the at least one the roller assembly includes a spring having a first end and a second end spaced apart from the first end, a first roller positioned on the first end of the spring, and a second roller positioned on the second end of the spring, the spring urging the first roller and the second roller into contact with the outer shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
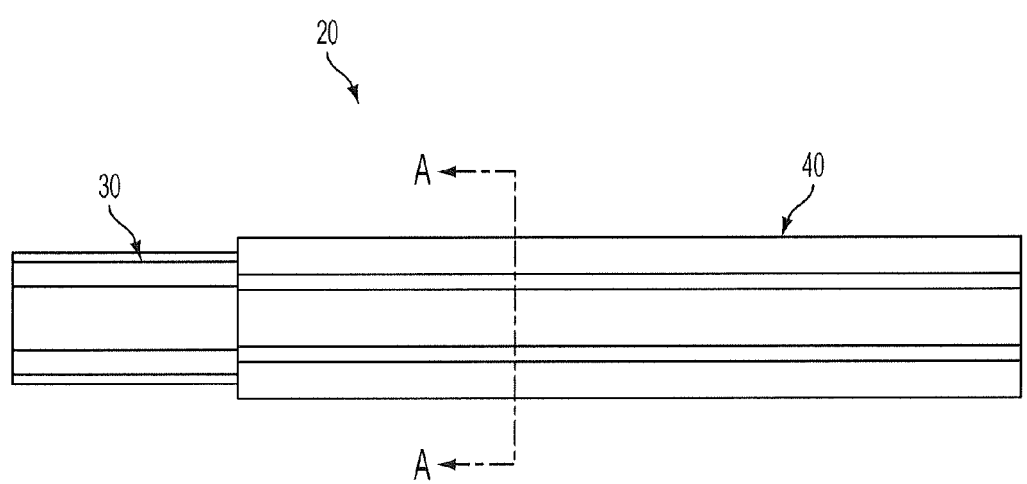
FIG. 1 is a side view of a telescoping shaft of a steering column according to an exemplary embodiment of the present invention.

Referring now to the Figures, where the invention will be described with reference to specific embodiments, without limiting same, FIG. 1 is a side view of a telescoping shaft 20 of a steering column according to an exemplary embodiment of the present invention. With reference to FIG. 1, the telescoping shaft includes an inner shaft 30 and an outer shaft 40. The inner shaft 30 is telescopically received within the outer shaft 40. In an exemplary embodiment the telescoping shaft may be an intermediate shaft in a steering column. However, the present invention is not limited to such a configuration, and it is understood that the telescoping shaft may be, for example, a steering shaft as well.

Figure 2:
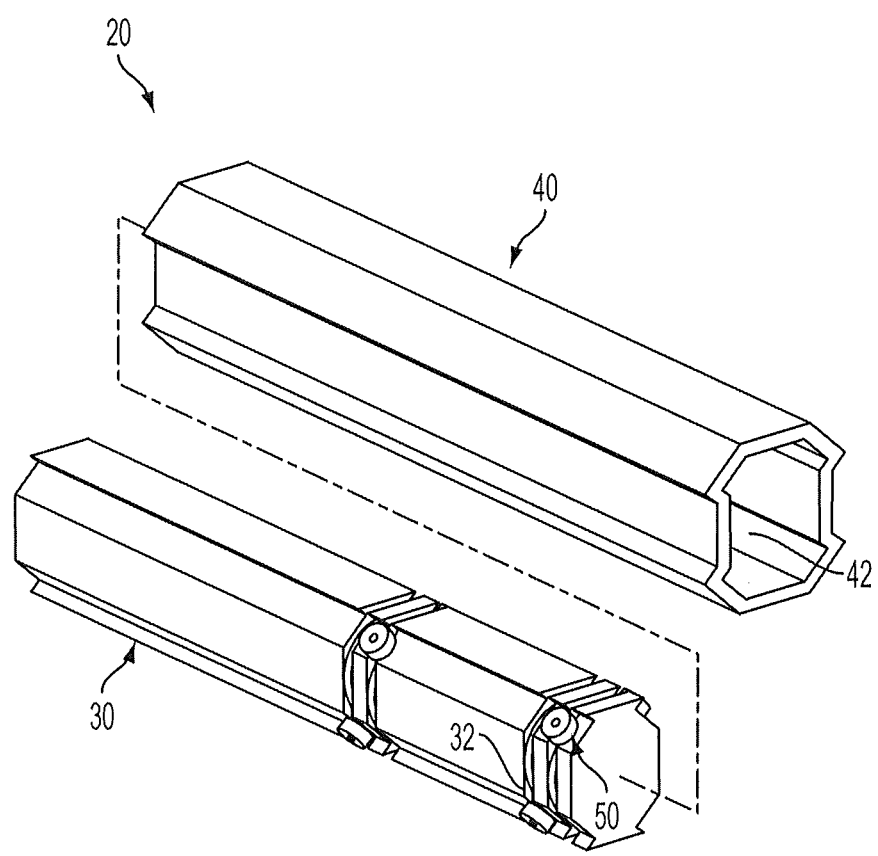
FIG. 2 is an exploded view of the telescoping shaft according to an exemplary embodiment of the present invention.

FIG. 2 is an exploded view of the telescoping shaft 20 according to an exemplary embodiment of the present invention. With reference to FIG. 2, the inner shaft 30 and outer shaft 40 are formed as non-cylindrical bodies. The inner shaft 30 may be formed as a solid or tubular body, and include at least one roller assembly 50 positioned on an outer periphery. The inner shaft 30 includes at least one groove 32 and a portion of each roller assembly 50 is received in a respective groove 32, as described further below, so as to secure that the roller assembly 50 to the inner shaft 30.

The outer shaft 40 includes a bore 42 extending therethrough in a longitudinal direction. The inner shaft 30 is telescopically received within the longitudinal bore 42 such that the inner shaft 30 is movable in the longitudinal direction. The inner shaft 30 and outer shaft 40 are substantially fixed against rotation relative to one another due to the non-cylindrical configuration. However, a sufficient clearance may exist between the inner shaft 30 and outer shaft 40 so that slight relative rotation may occur between the respective shafts.

Figure 3:
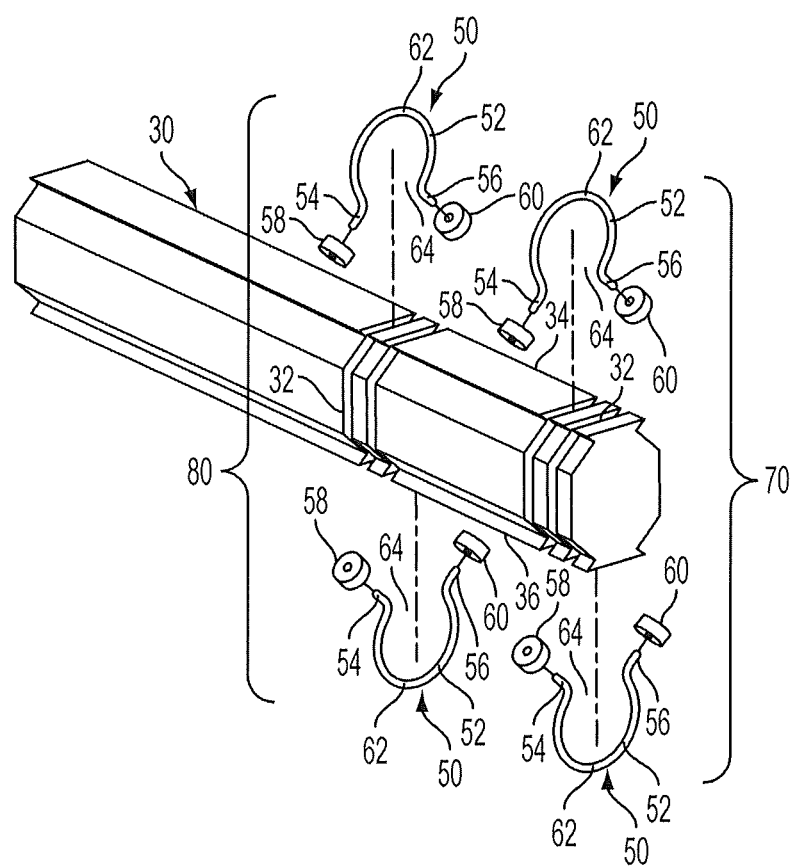
FIG. 3 is an exploded view of the inner shaft and the at least one roller assembly of FIG. 2 according to an exemplary embodiment of the present invention.

FIG. 3 is an exploded view of the inner shaft 30 and the at least one roller assembly 50. In an exemplary embodiment, the roller assembly 50 includes a spring 52 having a first end 54 and a second end 56 spaced apart from the first end 54. A first roller 58 is positioned on the first end 54 and a second roller 60 is positioned on the second end 56. The spring 52 includes a closed side 62 that is configured to fit around the inner shaft 30 and an open side 64 through which the inner shaft 30 may be received. The first end 54 and second end 56 of the spring 52 are segments that act as an axle for the first roller 58 and second roller 60, respectively, to rotate on.

The spring 52 may be substantially "omega" shaped, where the first end 54 and second end 56 are feet of the omega. The first end 54 and second end 56 are formed at the open side 64. Other suitable shapes and/or configurations for the spring 52 are envisioned where the inner shaft 32 may be received through an opening and rollers may be positioned at respective first and second ends. The "omega" shaped spring may allow for slight rotational flexing, whereas as other envisioned shapes may restrict or limit rotational damping. In addition, the spring 52 may comprise multiple springs.

In an exemplary embodiment, multiple roller assemblies 50 are positioned along the inner shaft 30. For example, a pair 70 of roller assemblies 50 may be positioned on the inner shaft 30. The roller assemblies 50 of the pair 70 of roller assemblies may be positioned to extend in opposite directions from each other. That is, respective closed sides 62 of the springs 52 of the roller assemblies 50 may be positioned on opposite sides of the inner shaft, so that the first and second rollers 58, 60 of one roller assembly 50 are positioned on opposite sides of the inner shaft 30 than the other roller assembly 50.

For example, the inner shaft 30 includes a first side 34 and a second side 36 on an opposite side of the inner shaft 30 from the first side 34. One roller assembly 50 of the pair 70 of roller assemblies may be positioned so that the closed side 62 of the spring 52 extends about the first side 34 of the inner shaft, and the first and second rollers 58, 60 are positioned adjacent to the second side 36 of the inner shaft. The other roller assembly 50 of the pair 70 of roller assemblies may include a spring 52 having the closed side 62 extend about the second side 36 of the inner shaft 30 while the first and second rollers 58, 60 are positioned adjacent to the first side 34. In addition, respective spring 52 of the roller assemblies 50 may be received in respective grooves 32 of the inner shaft 30.

It is understood that the present invention is not limited to the number of roller assemblies 50 described above, and that other suitable numbers of roller assemblies 50 are envisioned. For example, a second pair 80 of roller assemblies 50 may be positioned along the inner shaft 30 and spaced from the first pair 70 of roller assemblies. The second pair 80 of roller assemblies may be arranged similar to first pair 70 of roller assemblies. Additional roller assemblies 50, or pairs of roller assemblies 50 may also be included.

In the exemplary embodiments above, a pair of roller assemblies 50 refers to two roller assemblies 50 positioned adjacent to one another on the inner shaft 30. In the exemplary embodiments above, the pairs are described as extending in opposite directions. However it is understood that the present invention is not limited to such a configuration. For example, one pair of roller assemblies 50 may extend in the same direction while another pair of roller assemblies 50 extends in an opposite direction. A distance between individual roller assemblies of a single pair of roller assemblies may be smaller than a distance between adjacent pairs of roller assemblies 50.

Figure 4:
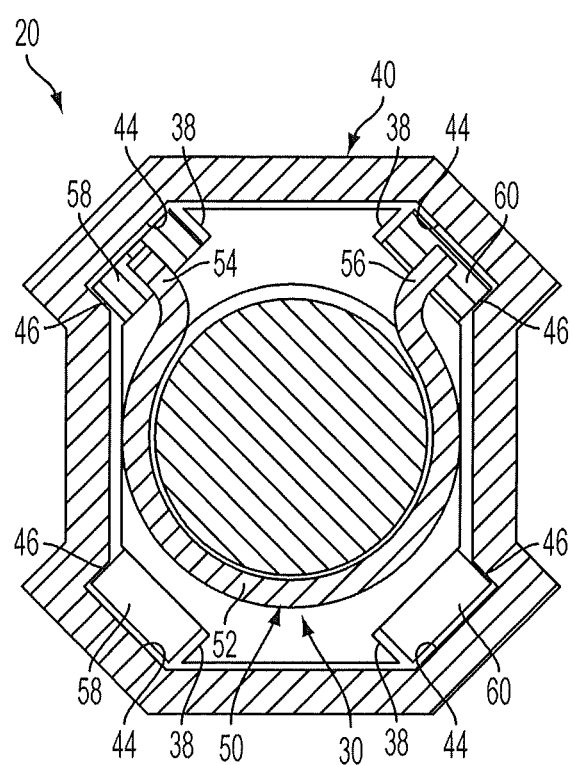
FIG. 4 is a cross section taken at A-A in FIG. 1 of the telescoping shaft according to an exemplary embodiment of the present invention.

FIG. 4 is a cross section taken at A-A in FIG. 1 of the telescoping shaft 20 according to an exemplary embodiment of the present invention. With reference to FIG. 4, the inner shaft 30 and outer shaft 40 are configured to form at least one roller groove 44 therebetween, in which the rollers 58, 60 of the at least one roller assembly 50 are positioned. In an exemplary embodiment, four roller grooves 44 are formed between the inner shaft 30 and outer shaft 40, positioned in which are respective first rollers 58 and second rollers 60 of oppositely positioned roller assemblies 50 of a roller assembly pair. Each roller groove 44 includes a bearing surface 46 formed on an inner surface of the outer shaft 40. The bearing surface 46 extends along at least part of the length of the roller groove 44. A second bearing surface 38 may be formed on an outer surface of the inner shaft 30 in each roller groove 44.

When assembled, the outer shaft 40 compresses the spring 52 of the roller assembly 50 on the inner shaft 30. As a result, the first and second rollers 58, 60 are urged into contact with a respective bearing surface 46 by the spring 52 in each roller assembly 50. The first and second roller 58, 60 roll along the bearing surface 46 on the inner surface of the outer shaft 40. In addition, a load may be applied that may cause relative rotation between the inner shaft 30 and the outer shaft 40. In such circumstances, the first and/or second rollers 58, 60 may come into contact with, and roll along a respective second bearing surface 38 of the inner shaft 30. For example, a load may be applied that causes the inner shaft 30 to rotate in a clockwise direction. Rotation of the inner shaft 30 in the clockwise direction causes the respective second bearing surfaces 38 to come into contact with diametrically opposed first roller 58 and second roller 60.

Figure 5:
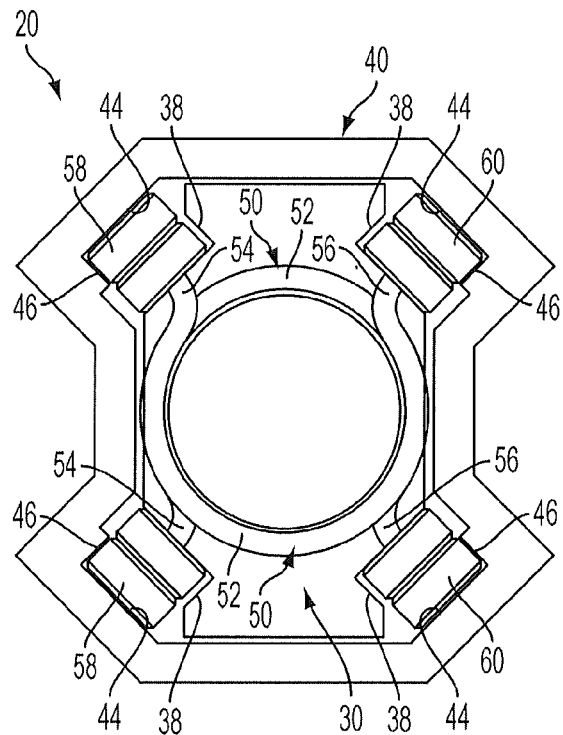
FIG. 5 is a cross section of the telescoping shaft and a roller assembly according to an alternative exemplary embodiment of the present invention.
Figure 6:
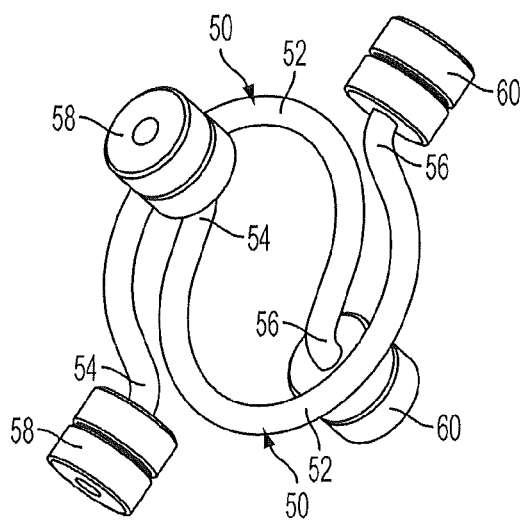
FIG. 6 is a perspective view of a pair of roller assemblies according to the alternative exemplary embodiment shown in FIG. 5.

FIG. 5 is a cross section of the telescoping shaft 20 and roller assembly 50 according to an alternative exemplary embodiment of the present invention. FIG. 6 is a perspective view of a pair of roller assemblies 50 according to the alternative exemplary embodiment shown in FIG. 5. It is understood that features similar to those described in the exemplary embodiments above are identified with the same reference numbers in the exemplary embodiments of FIGS. 5 and 6.

With reference to FIGS. 5 and 6, the roller assembly 50 may include two discrete first rollers 58 positioned at the first end 54 and two discrete second rollers 60 positioned at the second end 56 of the spring 52. The first rollers 58 and second rollers 60 are positioned in respective roller grooves 44 formed between the inner shaft 30 and outer shaft 40. The first and second rollers 58, 60 are urged into contact with a bearing surface 46 formed on the outer shaft 40 in the roller groove 44. In addition, a load may be applied that may cause relative rotation between the inner shaft 30 and the outer shaft 40. In such circumstances, the first and/or second rollers 58, 60 may come into contact with, and roll along a respective second bearing surface 38 of the inner shaft 30. In an exemplary embodiment, the radially inner most roller of the first rollers 58 and/or the radially inner most roller of the second rollers 60 come into contact with the respective second bearing surfaces 38.

For example, a load may be applied that causes the inner shaft 30 to rotate in a clockwise direction. Rotation of the inner shaft 30 in the clockwise direction causes the respective second bearing surfaces 38 to come into contact with diametrically opposed radially inner most first roller 58 and radially inner most second roller 60. It is understood however, that the second bearing surface may come into contact with either or both of the first rollers 58 and second rollers 60 in certain configurations. In addition, the spring 52 may deflect to cause the radially inner most roller of the first rollers 58 and/or the radially inner most roller of the second rollers 60 to contact the second bearing surface 38. In the exemplary embodiment shown in FIGS. 5 and 6, all four of the radially inner most rollers may contact the second bearing surface 38. Further, contact between the radially inner most rollers and the second bearing surface 38 may result from the dimensioning of the parts. The contact between the rollers 58, 60 and the second bearing surface 38 may occur with the spring in either a relaxed condition, a loaded condition or both.

In the exemplary embodiments above, the at least one roller assembly 50 forms a roller bearing between the inner shaft 30 and outer shaft 40 to accommodate low friction movement of the inner shaft 30 within the outer shaft 40 in the longitudinal direction. Lash, i.e., gaps between parts formed as a result of part-to-part variation during manufacturing may be taken up by the spring 52 urging the first and second rollers 58, 60 against the outer shaft 40. The roller assembly 50 may be easily and quickly assembled with the inner shaft 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A telescoping shaft in a steering column, the telescoping shaft comprising:
    an outer shaft having a bore extending in a longitudinal direction;
    an inner shaft telescopically received in the bore, the inner shaft rotationally fixed relative to the outer shaft and moveable relative to the outer shaft in the longitudinal direction; and
    at least one roller assembly positioned between the inner shaft and outer shaft, each roller assembly of the at least one the roller assembly comprising:
        a spring having a first end and a second end spaced apart from the first end;
        a first roller positioned on the first end of the spring; and
        a second roller positioned on the second end of the spring, the spring urging the first roller and the second roller into contact with the outer shaft;
    wherein the at least one roller assembly includes a first roller assembly and a second roller assembly, forming a first roller assembly pair;
    wherein the inner shaft comprises at least one groove, and the springs of the first roller assembly and the second roller assembly are each positioned in a respective groove;
    wherein the spring comprises a closed side and an open side, the first end and second end positioned at the open side; and
    wherein the closed side of the spring of the first roller assembly is positioned on a first side of the inner shaft and the closed side of the spring of the second roller assembly is positioned on a second side of the inner shaft, opposite to the first side, so that the first roller assembly and the second roller assembly extend in opposite directions.

2. The telescoping shaft of claim 1, wherein the spring is substantially omega shaped.

3. The telescoping shaft of claim 1, wherein the inner shaft and outer shaft are non-cylindrical.

4. The telescoping shaft of claim 1, wherein the outer shaft includes a first bearing surface and a second bearing surface and the first roller is urged against the first bearing surface and the second roller is urged against the second bearing surface.

5. The telescoping shaft of claim 1, wherein the inner shaft and outer shaft form an intermediate shaft in a steering column.

6. The telescoping shaft of claim 1, wherein the inner shaft and outer shaft form a steering shaft in a steering column.

7. A telescoping shaft in a steering column, the telescoping shaft comprising:
    an outer shaft having a bore extending in a longitudinal direction;
    an inner shaft telescopically received in the bore, the inner shaft rotationally fixed relative to the outer shaft and moveable relative to the outer shaft in the longitudinal direction; and
    at least one roller assembly positioned between the inner shaft and outer shaft, each roller assembly of the at least one the roller assembly comprising:
        a spring having a first end and a second end spaced apart from the first end;
        a first roller positioned on the first end of the spring; and
        a second roller positioned on the second end of the spring, the spring urging the first roller and the second roller into contact with the outer shaft;
    wherein the at least one roller assembly includes a first roller assembly and a second roller assembly, forming a first roller assembly pair;
    wherein the at least one roller assembly further includes a third roller assembly and a fourth roller assembly, forming a second roller assembly pair; and
    wherein the spring comprises a closed side and an open side;
    wherein the closed side of the spring of the third roller assembly is positioned on a first side of the inner shaft and the closed side of the spring of the fourth roller assembly is positioned on a second side of the inner shaft, opposite to the first side, so that the third roller assembly and fourth roller assembly extend in opposite directions.

8. The telescoping shaft of claim 7,
    wherein the first end and the second end are positioned at the open side.

9. The telescoping shaft of claim 7, wherein the inner shaft comprises at least one groove, and the springs are each positioned in a respective groove.

10. The telescoping shaft of claim 7, wherein at least one said spring is substantially omega shaped.

11. The telescoping shaft of claim 7, wherein the inner shaft and outer shaft are non-cylindrical.

12. The telescoping shaft of claim 7, wherein the outer shaft includes a first bearing surface and a second bearing surface and at least one said first roller is urged against the first bearing surface and at least one said second roller is urged against the second bearing surface.

13. The telescoping shaft of claim 7, wherein the inner shaft and outer shaft form an intermediate shaft in a steering column.

14. The telescoping shaft of claim 7, wherein the inner shaft and outer shaft form a steering shaft in a steering column.

15. A telescoping shaft in a steering column, the telescoping shaft comprising:
    an outer shaft having a bore extending in a longitudinal direction;
    an inner shaft telescopically received in the bore, the inner shaft rotationally fixed relative to the outer shaft and moveable relative to the outer shaft in the longitudinal direction; and
    at least one roller assembly positioned between the inner shaft and outer shaft, each roller assembly of the at least one the roller assembly comprising:
        a spring having a first end and a second end spaced apart from the first end;
        a first roller positioned on the first end of the spring; and a second roller positioned on the second end of the spring, the spring urging the first roller and the second roller into contact with the outer shaft;

wherein the inner shaft comprises at least one groove, and the springs of the first roller assembly and second roller assembly are positioned in a respective groove;

wherein the outer shaft includes a first bearing surface and a second bearing surface and the first roller is urged against the first bearing surface and the second roller is urged against the second bearing surface; and wherein the inner shaft and outer shaft are configured to form at least one roller groove between the inner shaft and outer shaft, and the first bearing surface and second bearing surface are positioned in respective roller grooves.

16. A telescoping shaft in a steering column, the telescoping shaft comprising:

an outer shaft having a bore extending in a longitudinal direction;

an inner shaft telescopically received in the bore, the inner shaft rotationally fixed relative to the outer shaft and moveable relative to the outer shaft in the longitudinal direction; and at least one roller assembly positioned between the inner shaft and outer shaft, each roller assembly of the at least one the roller assembly comprising:

a spring having a first end and a second end spaced apart from the first end;

a first roller positioned on the first end of the spring; and a second roller positioned on the second end of the spring, the spring urging the first roller and the second roller into contact with the outer shaft;

wherein the inner shaft comprises at least one groove, and the springs of the first roller assembly and second roller assembly are positioned in a respective groove;

further comprising two first rollers positioned at the first end of the spring and two second rollers positioned at the second end of the spring.

* * * * *